United States Patent [19]

Brandt

[11] 3,936,029

[45] Feb. 3, 1976

[54] PNEUMATIC AMPLIFIER HAVING A GAIN ADJUSTMENT MECHANISM INCORPORATED THEREIN

[76] Inventor: Robert O. Brandt, 600-E Forest Ridge Road, Garner, N.C. 27529

[22] Filed: Apr. 25, 1974

[21] Appl. No.: 464,126

[52] U.S. Cl. .............................................. 251/61.1
[51] Int. Cl.² ...................................... F16K 31/145
[58] Field of Search ...................... 137/82; 251/61.1

[56] References Cited
UNITED STATES PATENTS

| | | | |
|---|---|---|---|
| 3,415,275 | 12/1968 | Berggren | 251/61.1 X |
| 3,490,479 | 1/1970 | Mott et al. | 251/61.1 X |
| 3,707,982 | 1/1973 | Hogel | 137/82 X |
| 3,792,720 | 2/1974 | Robbins | 251/61.1 X |
| 3,844,529 | 10/1974 | Brandt et al. | 251/61.1 |

FOREIGN PATENTS OR APPLICATIONS 548,016 6/1956 Belgium .......................... 251/61.1

Primary Examiner—Henry T. Klinksiek
Attorney, Agent, or Firm—Mills and Coats

[57] ABSTRACT

The present invention relates to a pneumatic amplifier of the type having a main internal chamber with a thin imperviable member extending thereacross. The thin imperviable member responds to and amplifies a wide range of pressure input signals supplied to the main internal chamber of the pneumatic amplifier valve.

In effect, the imperviable member separates the main internal chamber into two compartments. The first compartment receives the pressure input signals which are to be amplified, and the other compartment on the opposite side of the imperviable member receives a steady flow of air from an air supply. Consequently, the imperviable member assumes an operative profile or contour due to the air pressure present in each of the two compartments.

A portion of the compartment channeling the air supply through the valve represents a positive and linear amplification of the particular pressure gain signal being applied to the valve. It was discovered that the particular gain of the pneumatic of the present invention could be varied and changed by effecting a change in the operative contour or profile of the imperviable member. To accomplish this, the pneumatic valve of the present invention includes a threaded shaft having a generally rounded head secured to the interior end thereof. By adjustably moving the threaded shaft, the generally rounded head engages the imperviable member and depresses or changes the contour of the valve to effectuate a change or varyance in gain.

5 Claims, 5 Drawing Figures

PNEUMATIC AMPLIFIER HAVING A GAIN ADJUSTMENT MECHANISM INCORPORATED THEREIN

The present invention relates to fluid valves and controls therefor, and more particularly to valves of the pneumatic amplifier type.

BACKGROUND OF THE INVENTION

In U.S. Pat. Application Ser. No. 359,533, filed May 11, 1973, and entitled "FLUID VALVE HAVING A PRESSURE RESPONSIVE INTERNAL MEMBRANE", now U.S. Pat. No. 3,844,529, there is disclosed what may properly be termed a pneumatic amplifier or a differential pressure transmitter valve. This disclosure will hereafter be referred to as the basic Brandt disclosure. As will become apparent from a reading and study of the Brandt disclosure, the particular valve thereof is designed to positively and linearly amplify pressure input signals. Generally reviewing the structure of the amplifier valve and how amplification is accomplished, it is seen from a study of this disclosure that the valve structure includes an open main internal chamber. Supported about the outer portions thereof by the valve structure and extending across said main internal chamber is an imperviable membrane member which effectively divides the internal main chamber into two compartments. The first compartment is designed to receive pressure input signals, while the second compartment is designed and adapted to receive and channel a supply air therethrough. Consequently, it is seen that the imperviable membrane member lies between two pressure systems. Essentially, amplification of input pressure signals, is accomplished by the response of the imperviable membrane member responding to the particular input pressure signal and restricting the flow of supply air through the valve structure. This restriction results in a pressure differential within the compartment within the valve structure channeling the supply air, the higher pressure of the pressure differential being a linear amplification of the input pressure signal.

It has been found that the gain of a particular amplifier valve is constant and is independent of the pressure signal applied and the flow rate of air passing through the valve. However, the principle problem lies in producing an amplifier valve that will yield a specific predetermined gain. In the basic Brandt disclosure referred to above, it was determined analytically that the gain of the amplifier valve shown therein could be varied by changing various valve parameters, particularly the radial demensions of the inner and outer seats. In attempting to producce an amplifier valve with a specific gain by controlling the parameters of the valve, it was found that such was difficult, if not nearly impossible, because of production limitations and other unconsidered factors that influence the gain.

SUMMARY OF THE INVENTION

In an attempt to find some means for changing and varying the gain of the amplifier in order that the gain may be set at a specific level, it was found that the gain was influenced by the profile or contour of the imperviable member disposed across the main internal chamber of the valve. In view of this, the present invention presents a gain adjustment mechanism incorporated within the amplifier valve body structure that is adapted to engage and change the contour or profile of the imperviable member disposed within the internal main chamber of the valve.

Specifically, the gain adjust mechanism includes a threaded shaft disposed within a bore extending through the valve body structure and open to the main internal chamber. Fixed to the inner most end of the threaded shaft is a rounded head which normally engages the imperviable member within the valve. By screwing the threaded shaft, the rounded head can be moved with respect to the valve structure such that it engages and changes the contour or profile of the imperviable member, consequently resulting in a change in the gain of the valve.

It is, therefore, an object of the present invention to provide a gain adjustment for a fluid amplifier valve of the type having a main internal chamber, separated by an imperviable member.

A further object of the present invention is to provide a pneumatic amplifier valve with a readily accessible gain adjustment control mechanism incorporated therein that may be utilized to adjust and set the gain of said pneumatic amplifier valve.

Still a further object of the present invention lies in the provision of a pneumatic amplifier valve having a main internal chamber formed therein separated by an imperviable member, and wherein there is provided a gain adjustment mechanism incorporated into said valve structure for engaging and changing the profile or contour of said imperviable member of effectuate a change in the gain of said amplifier valve.

Another object of the present invention is to provide a gain adjustment mechanism for a pneumatic amplifier that is simple and easy to adjust and can be adjusted externally of the valve structure.

A further object of the present invention is to provide a stable gain adjustment that is movable through a bore formed within said valve body structure, but is tightly held within said bore in a sealed relationship with respect to said valve body structure and is not prone to vibrate within said bore.

Other objects and advantages of the present invention will become apparent from a study of the following description and the accompanying drawings which are merely illustrative of the present invention.

DESCRIPTION OF THE PREFERRED EMBODIMENT

With further reference to the drawings, a fluid amplifying valve is shown therein and indicated generally by the numeral 10. Fluid amplifying valve 10 is of the same basic type valve as shown and described in U.S.

Pat. Application Ser. No. 359,533, referred to above. The complete disclosure of that application is herein incorporated by reference.

Figure 1:
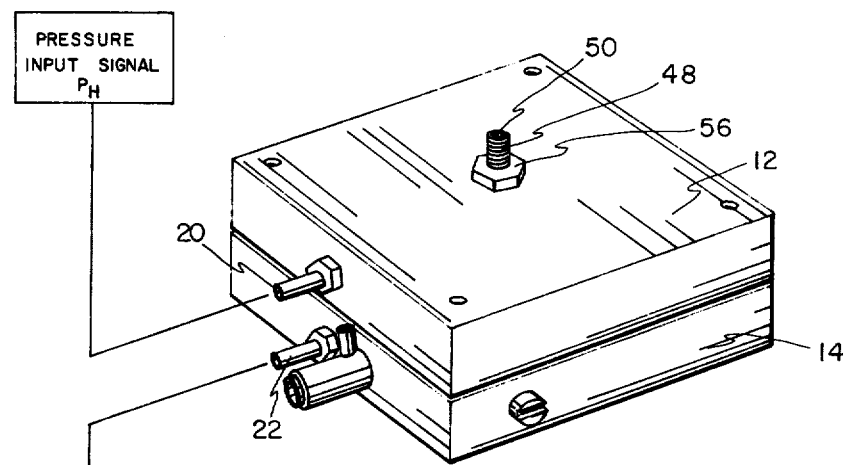
FIG. 1 is a perspective view of the fluid amplifier of the present invention having the gain adjustment mechanism incorporated therein.
Figure 2:
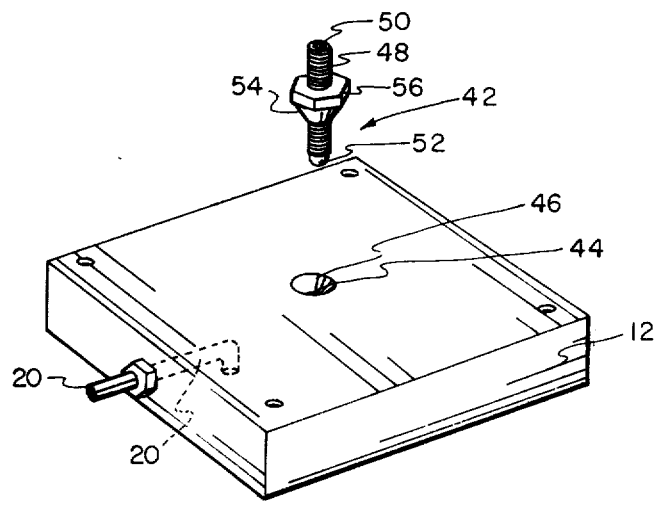
FIG. 2 is a disassembled perspective view of the fluid amplifier illustrating basic components thereof.
Figure 2:
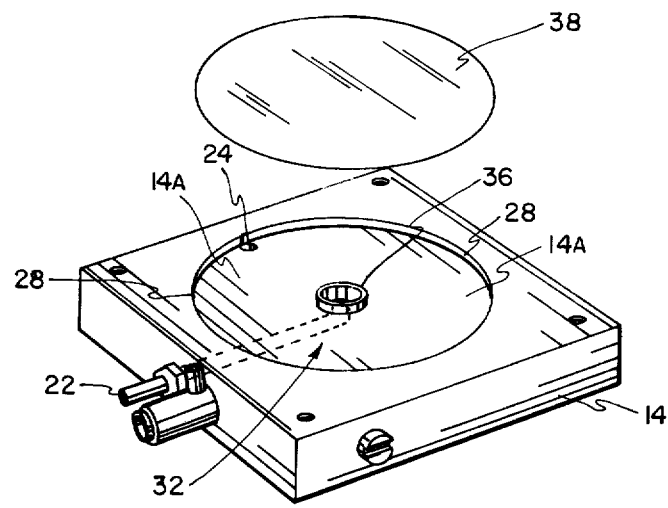
Figure 3:
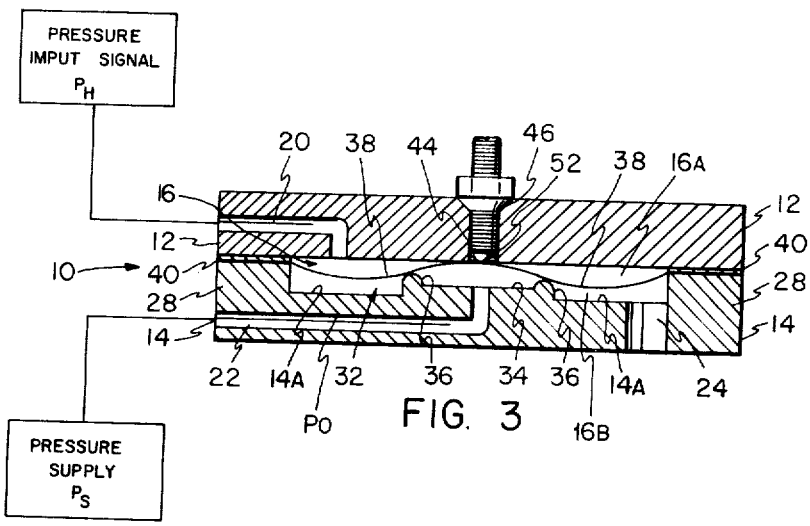
FIG. 3 is an enlarged sectional view of the fluid amplifier of the present invention with the contour of the imperviable member being exaggerated to better illustrate its relationship with other components of the valve.

Reviewing fluid amplifying valve 10, it will be observed from the drawings, that the same comprises upper and lower plates 12 and 14, respectively, said plates being secured together in opposed relationship by such means as screws being screwed into threaded openings formed within the corner of the valve body. As best seen in FIGS. 2 and 3, the lower plate 14 is recessed to form a main internal chamber 16 within the valve. Thus, the internal chamber 16 is bounded above and below by the inner faces of the upper and lower plates 12 and 14, respectively.

Upper plate 12 has formed therein a pressure signal input opening 20 which extends completely through a side of the upper plate 12 and is open to the main internal chamber 16. Moreover, the pressure signal input opening 20 is adapted to be connected to a pressure input signal, $P_H$, and adapted to allow the pressure input signal to move therethrough into the main internal chamber 16.

Lower plate 14 has integrally formed along the outer portions thereof a circular elevated collar 28 which is elevated relative to an inwardly adjacent inner face are 14A of the lower plate 14. Disposed inwardly of the recess inner face 14A is an elevated circular valve seat indicated generally by the numeral 32. The valve seat 32 comprises a central elevated base 34 that is disposed slightly above the level of the adjacent inner face 14A. Surrounding the elevated base 34 is an inner valve seat or circuit fence 36. As seen in FIG. 3, the top portion of the circular fence 36 is generally convex and extends above the elevated base 34 to form the inner valve seat.

The lower plate 14 of the fluid valve 10 also includes a pair of openings 22 and 24 formed therein, each of said openings extending through the lower plate and open to the main internal chamber 16 formed between upper and lower plates 12 and 14, respectively. Opening 22 is referred to as a pressure supply inlet opening and as a pressure out chamber, $P_O$. This double designation is appropriate since opening 22 is connected to a pressure supply, denoted $P_S$, preferably through a flow restricting device not shown. Consequently, a supply of fluid (which is air in this case since the valve of the penumatic type) is channeled into the main internal chamber 16 of the valve through opening 22. Also, as is apparent from a study of the basic Brandt disclosure, the pressure in opening 22 will under normal operating conditions be an amplification of the pressure input signal, $P_H$, consequently opening 22 is termed a pressure out chamber, and as such, is denoted $P_O$.

Separating the internal main chamber 16 into compartment 16a and 16b is generally relaxed imperviable membrane member 38. The membrane is held within the valve about the outer portions thereof between the collar 28 of the lower plate 14 and a generally circular resilient gasket 40 that is disposed between the membrane member and the outer portions of the inner face of the upper plate 12.

As particularly illustrated in FIG. 3, the imperviable membrane member 38 normally assumes a concave convex shape within the main internal chamber 16. It is appreciated that this particular shape or profile of the imperviable membrane member 38 is at least partially influenced by the pressure signal being applied into the main internal chamber of the valve, and the pressure supply of air that is being forced through supply inlet opening 22, through the main internal chamber 16 below the membrane member 38, and out the supply exit opening 24. It should be pointed out that although the supply inlet opening 22 may enter the valve structure at various points, it is preferable that the interior end (i.e. the end opening into the internal chamber 16) of the supply opening 22 be centrally disposed and in the case of the present valve, it is preferable that the interior end extend up through the lower plate 14 in general co-axial relationship with the valve seat 32. This assures that the air being derived from the fluid pressure supply, $P_S$, is emptied into the main internal chamber at a central point above the lower plate 14.

Figure 4:
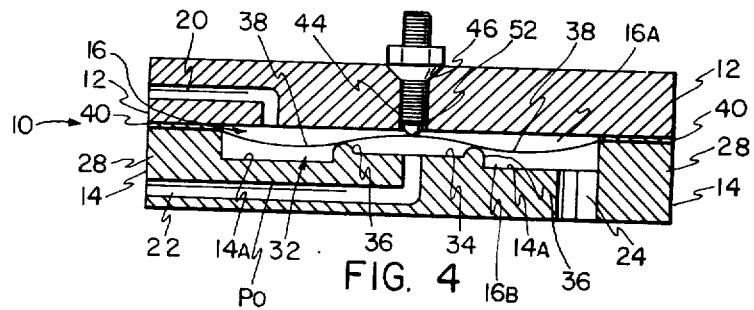
FIGS. 4–5 are schematic illustrations showing the gain adjustment mechanism in various positions with the contour of the imperviable membrane being changed accordingly.
Figure 5:
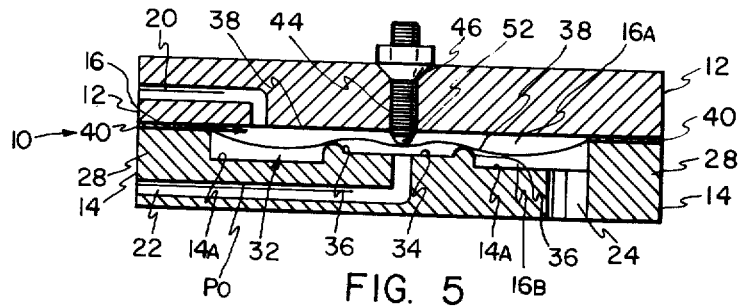

Turning to FIGS. 2 and 4–5, the gain adjustment mechanism for the valve 10 is shown therein and indicated generally by the numeral 42. It is seen that the gain adjustment mechanism 42 is secured within a threaded bore 44 that extends entirely through the upper plate 12 and is in general co-axial alignment with the interior end of opening 22 formed within the valve seat 36. Also, about the exterior surface of the upper plate 12, the top portion of the bore 44 includes a counter-sunken valve seat 46.

Threaded in the bore 44 is an elongated threaded shaft 48 that includes an Allen head 50 formed in the outer end thereof, the outer end referring to the end that normally lies outside of the valve structure.

Fixed to the inner end, the inner end referring to that end of the threaded shaft 48 that normally lies interiorly of the valve structure, is contact means 52 in the form of a rounded head.

Formed intermediately on said threaded shaft 48 is tapered seal 54 that is adapted to seat witin the countersunken valve seat 46 formed about the exterior end of the bore 44. Disposed adjacent said seal 54 and threaded on said threaded shaft 48 is a seal tightener 56 in the form of a nut.

In operation, the threaded shaft 48 is normally positioned to where the contact means or rounded head 52 is engaged with the imperviable member 38 above the valve seat 36. In the case of the particular valve shown herein, that portion of the imperviable member 38 lying over the valve seat 36 and in the vicinity of contact means 52 generally convex shape. It was found, that the gain of the amplifier could be adjusted by depressing this convex area of the imperviable member 38.

As viewed in FIGS. 3–5, as the threaded shaft 48 is moved downwardly, i.e., in the direction of the main internal chamber 16, the contact means 52 engages the imperviable member 38. As illustrated in the drawings, as the threaded shaft 48 is continually moved downwardly the contact means 52 depresses the imperviable member 38 and effectuates a change in the contour or profile of that imperviable member. As the shape, profile, or contour of the imperviable member is changed, the gain of the amplifier valve 10 is accordingly changed.

In view of the basic operating principles of the pneumatic amplifier shown herein, and as disclosed in the basic Brandt disclosure, it is appreciated that a depression of the imperviable member 38 downward toward the valve seat 36 has the general effect of increasing the air flow restriction across the valve seat 36. Consequently then, the downward depression of the imperviable member 38 increases the gain of the amplifier valve 10 since the pressure of the fluid or air in opening 22 is an amplification of the pressure input signal $P_H$, applied on the other side of the imperviable member 38.

In laboratory test, it was found that the gain adjustment mechanism 42 discussed above enables the gain of the particular valves to be adjusted twenty-five to thirty (25 to 30) percent. Thus, by designing the amplifier valve of the present invention with the particular parameters preselected, a valve can be produced with a gain that falls within a predetermined range. Then with the gain adjustment mechnaism 42, the particular gain of the amplifier valve 10 can be adjusted to a predetermined specific level. Also if it is desired to change the sign of the amplifier 10 for a certain purpose or operation, it follows that this can be accomplished within the 25 to 30 percent range by adjusting the threaded shaft 48 and contact means 52 accordingly.

It should be noted, that the bore 44 extends completely through the valve body structure and, therefore, it is important that the bore be sealed. To make sure that the bore 44 is sealed and that air cannot escape therethrough, the gain adjustment mechanism 42 includes the previously referred to seal 54 and seal tightener 56. The seal 54 is at least slightly deformable such that when the contact means 52 is stationed in the position desired, the seal tightener nut 56 can be turned towards said seal 54 for engagement therewith while the threaded shaft 48 is being held in a stationary position. The tightening of the seal tightener 56 against the seal 54 causes the seal to be pressed tightly downward within the countersunken valve seat 46 formed in the top portion of the bore 44. This seals the bore 44.

From the above specification, it is apparent that the gain adjustment mechanism of the present invention provides an easy, precise and convenient means for adjusting the gain of a fluid valve amplifier of the type disclosed herein. In addition, the gain adjustment mechanism 32 gives the valve flexibility in that the gain of the valve may be adjusted for various operations.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

The terms "upper", "lower", "forward", "reward", etc., have been used herein merely for the convenience of the foregoing specification and in the appended claims to described the PNEUMATIC AMPLIFIER HAVING A GAIN ADJUSTMENT MECHANISM INCORPORATED THEREIN and its parts as oriented in the drawings. It is to be understood, however, that these terms are in no way limiting to the invention since the PNEUMATIC AMPLIFIER HAVING A GAIN ADJUSTMENT MECHANISM INCORPORATED THEREIN may obviously be disposed in many different positions when in actual use.

What is claimed is:

1. A fluid amplifier valve having a gain adjustment mechanism incorporated therein for adjusting the gain of various input pressure signals received by the valve, said amplifier valve comprising:
   a. a valve body structure having a main internal chamber formed therein;
   b. a pressure signal opening means formed within said valve structure for enabling fluid pressure signals to be transmitted into said main internal chamber;
   c. a fluid supply inlet opening means formed within said valve body for enabling fluid from a supply to be transmitted into said main internal valve chamber;
   d. a fluid supply exit opening means formed within said valve body structure for enabling the fluid supply transmitted into said main internal chamber to exit therefrom;
   e. a thin imperviable member extending across said main internal chamber and supported about the outer portions thereof by said valve body structure so as to separate the fluid of said pressure signal from the fluid supply passing through said main internal chamber;
   f. mounting means movably mounted in said valve structure; and
   g. contact means operatively connected to said movable mounting means for engaging said imperviable member extending across said main internal chamber and varying the gain of said amplifier valve, whereby the gain of said amplifier valve may be selectively adjusted by moving said contact means relative to said valve structure such that the shape of the imperviable member within said main internal chamber is influenced thereby enabling the gain of said fluid valve to be selectively varied and adjusted by moving said contact means in order that the shape or contour of said imperviable member may change relative to said valve structure and give rise to a change in gain.

2. The fluid amplifier valve of claim 1 wherein said movable mounting means includes: a threaded shaft normally threaded into a bore formed in said valve structure and open to said main internal chamber, said bore being countersunk about the exterior of said valve structure and said threaded shaft having a seal formed intermediately thereon and adpated to rest adjacent the countersunken portion of said bore for sealing said bore; a seal tightener provided on said threaded shaft adjacent said seal for engaging said seal and tightening the same relative to said valve structure; and wherein said contact means includes a generally round headed ball fixed to the end of said threaded shaft normally disposed interiorly of the amplifier valve.

3. The amplifier valve of claim 1 wherein said amplifier valve includes a central circular seat formed within said internal main chamber and wherein said movable mounting means and said contact means are axially aligned with said central circuit seat.

4. The amplifier valve of claim 3 wherein said central circular seat extends around said fluid supply inlet opening means and is concentric therewith; and wherein said movable mounting means and said associated contact means are axially aligned with said fluid supply inlet opening means.

5. The amplifier valve of claim 1 wherein said valve structure includes a threaded bore formed therein and open to said main internal chamber and adapted to receive said movable mounting means which includes a threaded shaft secured within said threaded bore, said threaded bore being provided with a countersunken seal seat about the outer portion thereof and said threaded shaft including a seal formed intermediately thereon and adapted to seat within said countersunken seal seat in order to seal said amplifier valve and prevent fluid flow from said internal main chamber through said threaded bore; and wherein said contact means includes a generally rounded head fixed to the end of said threaded shaft normally disposed interiorly of said valve structure, whereby said generally rounded head may engage and contact said imperviable member extending across said main internal chamber and wherein said head may be utilized to change the contour of said imperviable member by selectively screwing said threaded shaft and accordingly moving said rounded head relative to said valve body structure.

* * * * *